(12) United States Patent
Shibata et al.

(10) Patent No.: US 9,966,614 B2
(45) Date of Patent: May 8, 2018

(54) FUEL CELL

(71) Applicant: TOYOTA JIDOSHA KABUSHIKI KAISHA, Toyota-shi, Aichi-ken (JP)

(72) Inventors: Kazunori Shibata, Mishima (JP); Yasushi Araki, Gotenba (JP); Takashi Kajiwara, Gotenba (JP); Masayuki Ito, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 210 days.

(21) Appl. No.: 14/689,671

(22) Filed: Apr. 17, 2015

(65) Prior Publication Data

US 2015/0303494 A1 Oct. 22, 2015

(30) Foreign Application Priority Data

Apr. 21, 2014 (JP) ................................ 2014-087261

(51) Int. Cl.
| | |
|---|---|
| *H01M 8/02* | (2016.01) |
| *H01M 8/0273* | (2016.01) |
| *H01M 8/0276* | (2016.01) |
| *H01M 8/241* | (2016.01) |
| *H01M 8/2457* | (2016.01) |
| *H01M 8/2483* | (2016.01) |
| *H01M 8/028* | (2016.01) |

(52) U.S. Cl.
CPC ....... *H01M 8/0273* (2013.01); *H01M 8/0276* (2013.01); *H01M 8/241* (2013.01); *H01M 8/2457* (2016.02); *H01M 8/2483* (2016.02); *H01M 8/028* (2013.01)

(58) Field of Classification Search
None
See application file for complete search history.

(56) References Cited

U.S. PATENT DOCUMENTS

2002/0086196 A1* 7/2002 Utsunomiya ....... H01M 8/0206
429/509
2004/0234831 A1* 11/2004 Kobayashi ............ H01M 8/242
429/483

(Continued)

FOREIGN PATENT DOCUMENTS

| CA | 2861978 A1 | 9/2013 |
|---|---|---|
| CN | 1536698 A | 10/2004 |

(Continued)

OTHER PUBLICATIONS

U.S. Appl. No. 14/741,882, filed Jun. 17, 2015.

*Primary Examiner* — Barbara L Gilliam
*Assistant Examiner* — Adam A Arciero
(74) *Attorney, Agent, or Firm* — Hunton Andrews Kurth LLP (57) ABSTRACT

A fuel cell includes a membrane electrode assembly; a frame configured to support the membrane electrode assembly from its outer edge; a first separator plate and a second separator plate configured to sandwich the membrane electrode assembly and the frame therebetween; and an elastomer. The first separator plate includes an elastically deformable protruding portion projecting toward an opposite side to the frame. The frame has a recessed cavity portion facing the protruding portion of the first separator plate. The elastomer is placed in at least part of the cavity portion.

6 Claims, 7 Drawing Sheets

(56) References Cited

U.S. PATENT DOCUMENTS

| | | | |
|---|---|---|---|
| 2007/0020505 | A1 | 1/2007 | Grafl et al. |
| 2009/0286136 | A1* | 11/2009 | Yamamoto .......... H01M 8/0247 |
| | | | 429/434 |
| 2010/0129725 | A1 | 5/2010 | Roy et al. |
| 2015/0086899 | A1 | 3/2015 | Iritsuki |

FOREIGN PATENT DOCUMENTS

| | | | |
|---|---|---|---|
| JP | 2006-019204 | A | 1/2006 |
| JP | 2006-054058 | A | 2/2006 |
| JP | 2006-527903 | A | 12/2006 |
| JP | 2007-294248 | A1 | 11/2007 |
| JP | 2008-547183 | A | 12/2008 |
| JP | 2010-073622 | A | 4/2010 |
| WO | 2013/141079 | A1 | 9/2013 |

\* cited by examiner

FUEL CELL

INCORPORATION BY REFERENCE

The disclosure of Japanese Patent Application No. 2014-087261 filed on Apr. 21, 2014 including the specification, drawings and abstract is incorporated herein by reference in its entirety.

BACKGROUND OF THE INVENTION

1. Field of the Invention

The present invention relates to a fuel cell.

2. Description of Related Art

Japanese Patent Application Publication No. 2006-54058 (JP 2006-54058 A) describes a separator plate of a fuel cell. The separator plate is made of a sheet metal having a sealing projection. The sealing projection is provided with a polymer elastic layer, and the polymer elastic layer abuts with a polymer membrane to perform sealing.

In a case where the separator plate is made of a material (e.g., titanium, SUS, aluminum, and the like) having a large elongation, thickness tolerances of the separator plate, a MEA, and the like can be absorbed by deformation of the sealing projection, but it might be difficult to maintain a pressure of the sealing portion at a large value.

SUMMARY OF THE INVENTION

An aspect of the present invention relates to a fuel cell including: a membrane electrode assembly; a frame configured to support the membrane electrode assembly from its outer edge; a first separator plate and a second separator plate configured to sandwich the membrane electrode assembly and the frame therebetween; and an elastomer. The first separator plate includes an elastically deformable protruding portion projecting toward an opposite side to the frame. The frame has a recessed cavity portion facing the protruding portion of the first separator plate. The elastomer is placed in at least part of the cavity portion. According to the fuel cell, a reaction force due to the elastomer is added to a reaction force due to elastic deformation of the protruding portion of the separator plate, thereby making it possible to increase a linear pressure (a sealing pressure) of a sealing line between the fuel cells.

The elastomer may be a rubber material or a urethane material. This makes it possible to prepare the elastomer having a necessary elasticity at a low cost.

The cavity portion may include a bottom and a side face portion. The elastomer may be provided on the bottom of the cavity portion. According to such a configuration, variations due to manufacturing tolerances of the separator plate and the frame can be absorbed in a low-linear-pressure (low-sealing-pressure) state before the separator plate makes contact with the elastomer. Consequently, a necessary linear pressure (sealing pressure) can be secured in a high-linear-pressure state (an elastomer-reaction-force generation state) after the separator plate makes contact with the elastomer.

In a state where the first separator plate is not deformed by an external force, the elastomer may make contact with both the first separator plate and the frame. According to such a configuration, at the time of compression to form a fuel cell stack, it is possible to achieve a large linear pressure (sealing pressure) in an entire region.

The cavity portion may include a bottom and a side face portion. The elastomer may be provided on the side face portion of the cavity portion. This makes it possible to relax a stress to be applied to the side surface of the cavity of the frame.

The elastomer may be provided on a first-separator-plate side of the cavity portion. This makes it possible to relax a stress to the protruding portion.

Note that the present invention can be realized in various aspects. For example, the present invention is achievable in a form of a frame for a fuel cell or the like, in addition to the fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
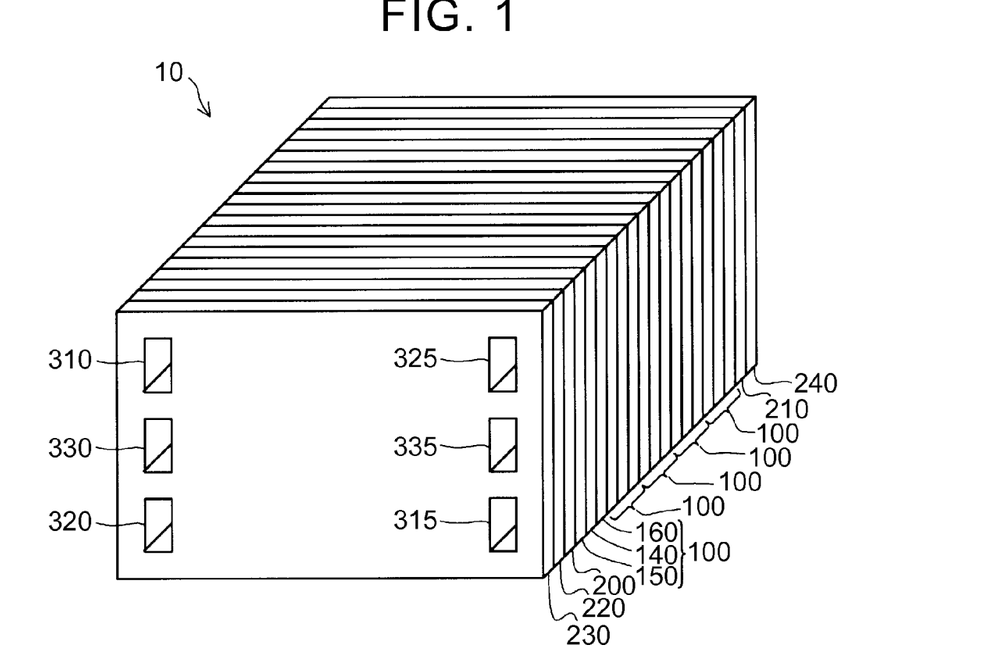
FIG. 1 is an explanatory view schematically illustrating an appearance of a fuel cell stack.

FIG. 1 is an explanatory view schematically illustrating an appearance of a fuel cell stack 10. The fuel cell stack 10 includes fuel cells 100 (hereinafter also referred to as "single cells"), terminal plates 200, 210, an insulation plate 220, and end plates 230, 240. The fuel cell 100 includes a frame 140, and a pair of separator plates (a first separator plate 150 and a second separator plate 160). The frame 140 is a frame-shaped member made of resin. A membrane electrode assembly (MEA) is provided inside the frame 140. The first separator plate 150 and the second separator plate 160 sandwich the frame 140 therebetween. A plurality of fuel cells 100 is provided in a laminated manner. The terminal plates 200, 210 are placed on opposite sides of the fuel cells 100 thus laminated, and are used to take out a voltage and a current from the fuel cells 100. The insulation plate 220 is placed outside the terminal plate 200. Note that, depending on a fixed part between the fuel cell stack 10 and a body of a vehicle in which the fuel cell stack 10 is provided, the insulation plate may be placed outside the terminal plate 210. The end plates 230, 240 are placed on opposite sides of the fuel cell stack 10 so as to fasten the fuel cells 100, the terminal plates 200, 210, and the insulation plate 220.

The fuel cells 100, the terminal plate 200, the insulation plate 220, and the end plate 230 each have a plurality of openings, and manifolds 310, 315, 320, 325, 330, 335 are formed through the openings. The manifold 310 is used to supply an oxidant gas to the fuel cells 100, so the manifold 310 is also referred to as an "oxidant gas supply manifold 310." Hereinafter, from the viewpoint of respective roles, the manifolds 315, 320, 325, 330, 335 are respectively referred to as an "oxidant gas discharge manifold 315," a "fuel gas supply manifold 320," a "fuel gas discharge manifold 325, a "refrigerant supply manifold 330," and a "refrigerant discharge manifold 335."

Figure 2:
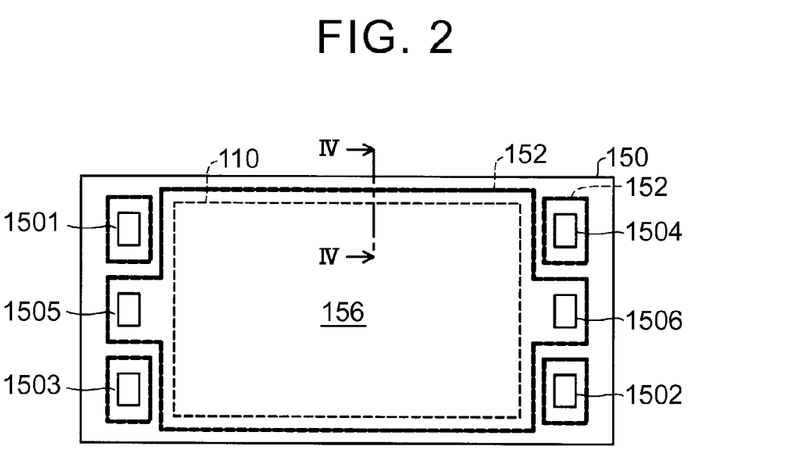
FIG. 2 is an explanatory view illustrating a first separator plate.

FIG. 2 is an explanatory view illustrating the first separator plate 150. The first separator plate 150 is a plate-shaped member made of metal and having a generally rectangular shape. Openings 1501, 1502, 1503, 1504, 1505, 1506 are formed on opposed sides of the first separator plate 150, and the openings 1501, 1502, 1503, 1504, 1505, 1506 are used to form the manifolds 310, 315, 320, 325, 330, 335 (FIG. 1), respectively. The first separator plate 150 includes, in its central part, a flow path forming portion 156 having an irregular shape. A membrane-electrode-assembly-110 side of the flow path forming portion 156 is a region through which reactant gas flows, and that side of the flow path forming portion 156 which is opposite to the membrane-electrode-assembly-110 side is a region through which refrigerant flows. The first separator plate 150 includes protruding portions 152 individually surrounding the openings 1501, 1502, 1503, 1504, and a protruding portion 152 surrounding the openings 1505, 1506 and the flow path forming portion 156. The protruding portions 152 are pressed by the second separator plate 160, so as to form a sealing line.

Figure 3:
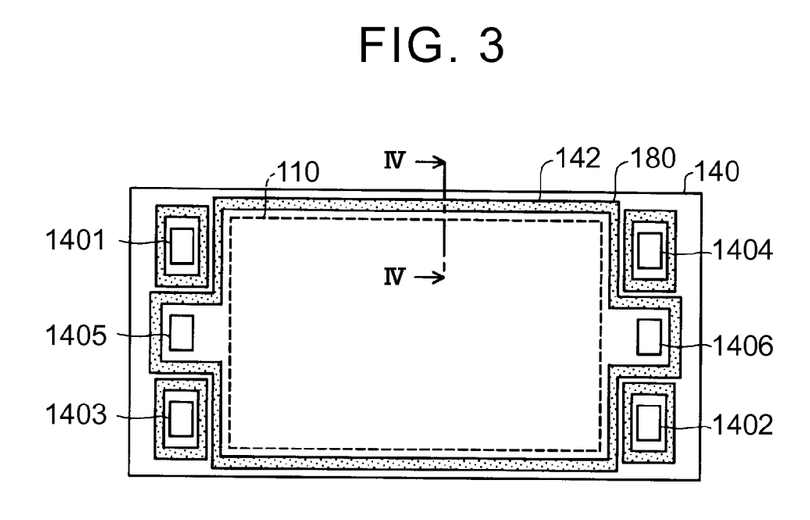
FIG. 3 is an explanatory view illustrating a frame and a membrane electrode assembly.

FIG. 3 is an explanatory view illustrating the frame 140 and the membrane electrode assembly 110. The frame 140 has a generally rectangular frame shape made of a thermo setting resin such as a phenolic resin or an epoxy resin. The resin used herein may be a melamine resin, a urea resin, an unsaturated polyester resin, a polyimide resin, or the like instead of the phenolic resin and the epoxy resin. The frame 140 supports the membrane electrode assembly 110 from its outer edge. The membrane electrode assembly includes an electrolyte membrane having proton conductivity, and a catalyst layer formed on both surfaces of the electrolyte membrane. Note that the membrane electrode assembly 110 may be a membrane-electrode & gas diffusion layer assembly (MEGA) further including a gas diffusion layer on a catalyst layer. Opening 1401, 1402, 1403, 1404, 1405, 1406 are formed on opposed sides of the frame 140, and the openings 1401, 1402, 1403, 1404, 1405, 1406 are used to form the manifolds 310, 315, 320, 325, 330, 335 (FIG. 1), respectively.

The frame 140 includes a recessed portion 141 formed in a recessed shape such that a first separator plate side of the frame 140 becomes an cavity portion 142, at a position corresponding to the protruding portion 152 of the first separator plate 150. An elastomer 180 made of a rubber material is placed in at least part of the recessed portion 141. The elastomer 180 should be softer than a material forming the frame 140. If the elastomer 180 is softer than the material forming the frame 140, the elastomer 180 is deformed first to generate a reaction force. The elastomer 180 may be made of a urethane material, other than the rubber material. This makes it possible to prepare the elastomer 180 having a necessary elasticity at a low cost. Note that, as the urethane material, a flexible urethane foam or a low-elasticity polyurethane foam can be used.

Figure 4:
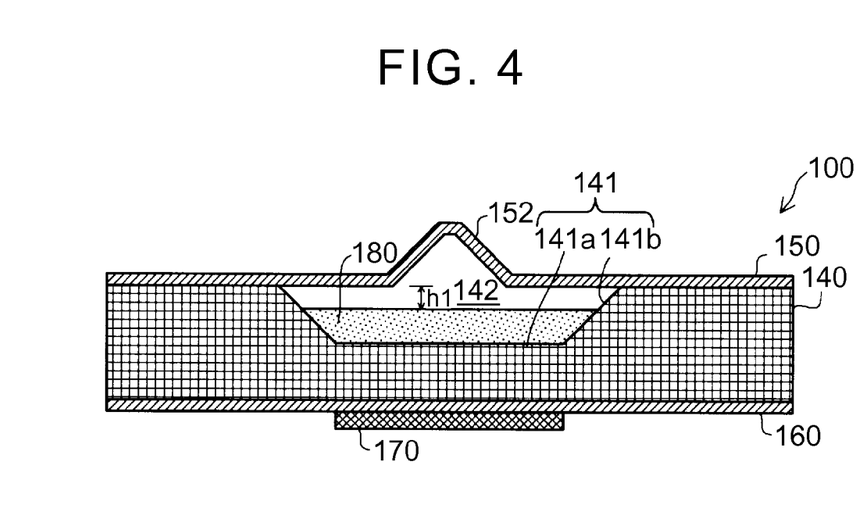
FIG. 4 is an explanatory view illustrating a section of a sealing line of a fuel cell.

FIG. 4 is an explanatory view illustrating a section of a sealing line of the fuel cell 100. FIG. 4 illustrates a partial sectional structure of the fuel cell 100 taken along a line IV-IV in FIGS. 2, 3. The first separator plate 150 and the second separator plate 160 sandwich the frame 140 therebetween. The first separator plate 150 includes the protruding portions 152 projecting toward an opposite side to the frame 140. The frame 140 includes the recessed portion 141 formed such that a first separator plate side of the frame 140 is recessed to form the cavity portion 142, at a position corresponding to a backside of the protruding portion 152. The recessed portion 141 includes a bottom 141a, and a side surface 141b. In the present embodiment, the elastomer 180 is placed on the bottom 141a of the recessed portion 141. An interval from that surface of the frame 140 which is on the first separator plate side to the elastomer 180 is h1. A rubber sheet 170 is placed on that side of the second separator plate 160 which is opposite to the frame 140. The protruding portion 152 of the first separator plate 150 is pressed by a second separator plate 160 of an adjacent cell (a single fuel cell 100) via a rubber sheet 170 thereof, so that a sealing line is formed. Accordingly, the rubber sheet 170 may be placed on a top of the protruding portion 152.

Figure 5:
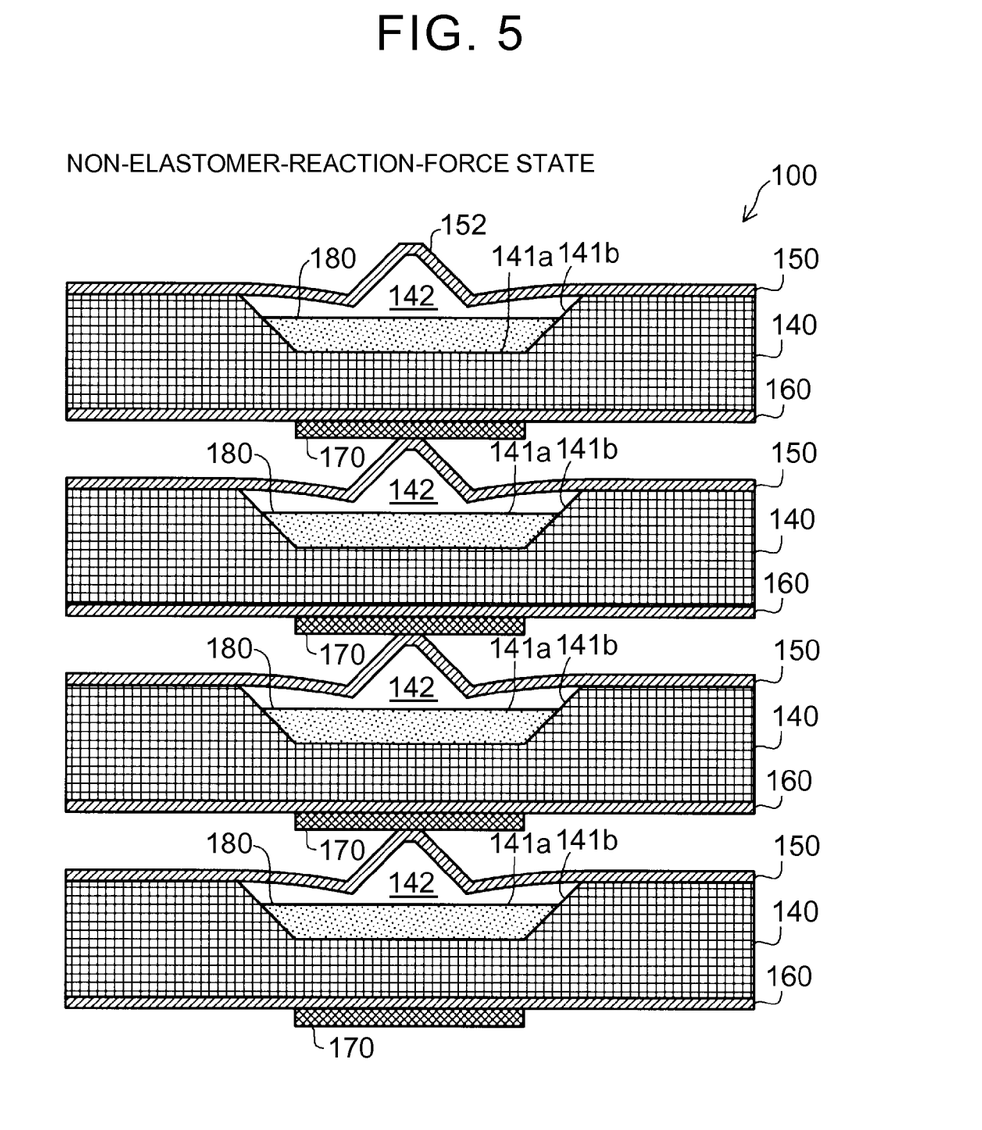
FIG. 5 is an explanatory view illustrating a state where fuel cells are laminated and slightly compressed in a laminating direction.

FIG. 5 is an explanatory view illustrating a state where the fuel cells 100 are laminated and slightly compressed in a laminating direction. When the fuel cells 100 are laminated and compressed in the laminating direction, the protruding portion 152 of one fuel cell 100 is pressed by the second separator plate 160 of another cell (another single fuel cell 100) adjacent to the one fuel cell 100 via the rubber sheet 170 of the another cell. At this time, the protruding portion 152 of the first separator plate 150 and both side parts of the protruding portion 152 are elastically deformed by a reaction force from the second separator plate 160, so as to be bent toward the cavity portion 142 of the frame 140. Note that, in a state illustrated in FIG. 5, the first separator plate 150 does not make contact with the elastomer 180. Since no reaction force of the elastomer 180 is generated in a state before the first separator plate 150 makes contact with the elastomer 180, this state is referred to as a "non-elastomer-reaction-force state."

Figure 6:
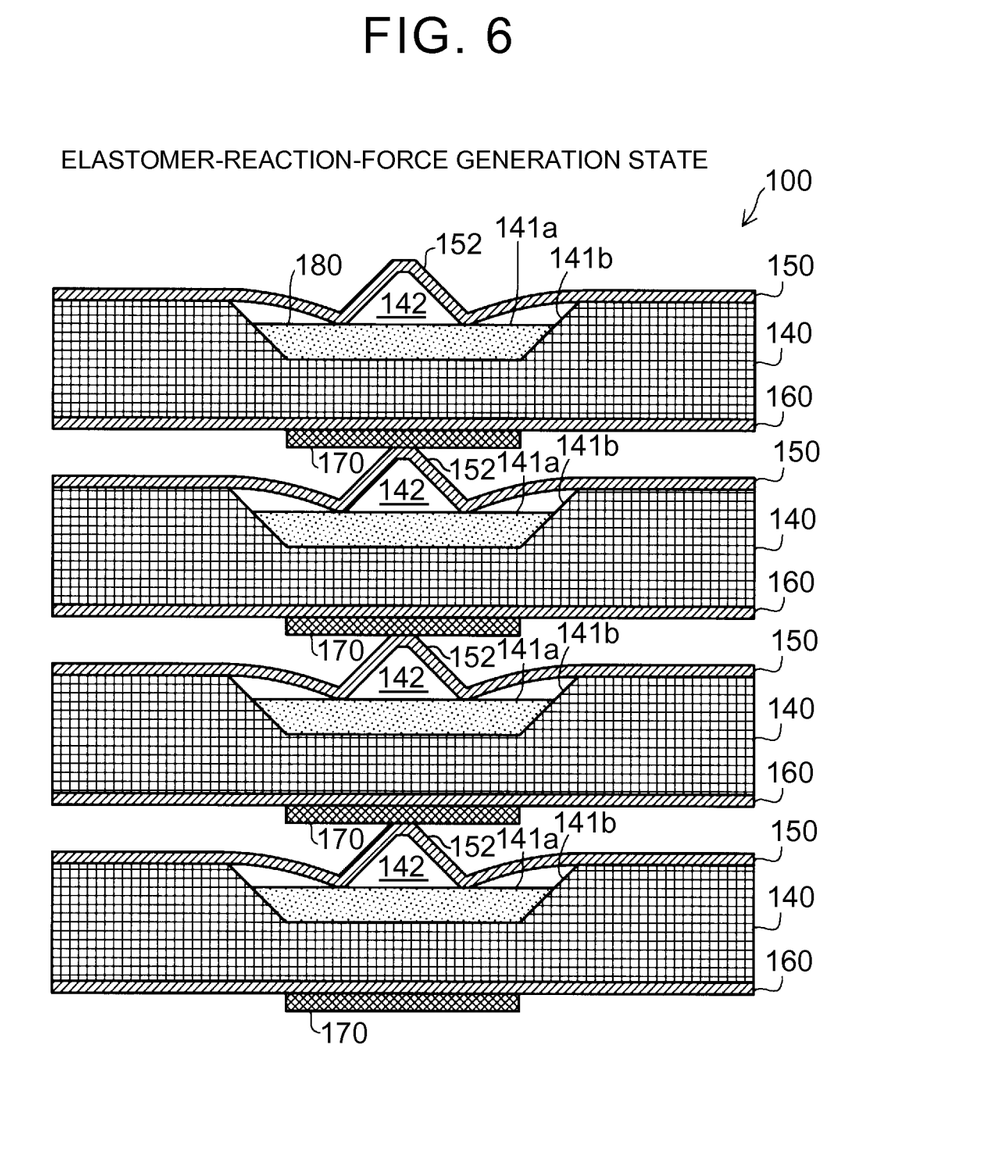
FIG. 6 is an explanatory view illustrating a state where the fuel cells are further compressed in the laminating direction from the state illustrated in FIG. 5.

FIG. 6 is an explanatory view illustrating a state where the fuel cells 100 are further compressed in the laminating direction from the state illustrated in FIG. 5. In this state, a root of the protruding portion 152 makes contact with the elastomer 180. Accordingly, a reaction force of the elastomer 180 is added to a reaction force generated by elastic deformation of the first separator plate 150. That is, when the elastomer 180 is provided, it is possible to obtain a stronger reaction force even at the same amount of compression (stroke). Note that a state obtained after the first separator plate 150 makes contact with the elastomer 180 is referred to as an "elastomer-reaction-force generation state."

Figure 7:
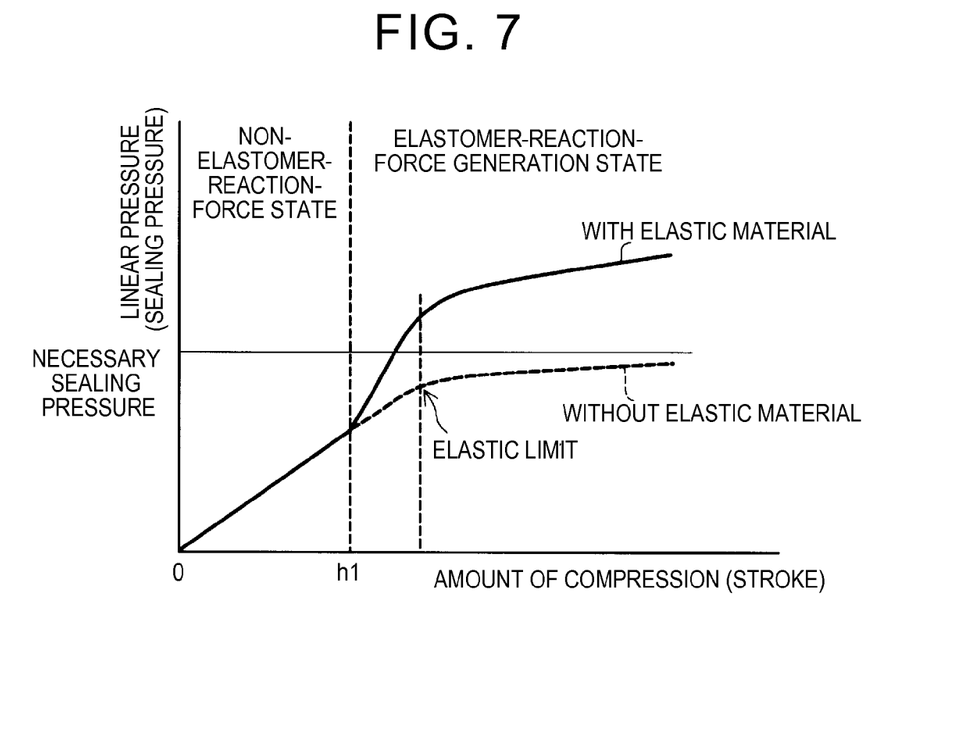
FIG. 7 is an explanatory view to compare a case where an elastomer is provided, with a case where no elastomer is provided, in terms of a relationship between an amount of compression (stroke) and a linear pressure (a sealing pressure) at the time of fastening a fuel cell stack.

FIG. 7 is an explanatory view to compare a case where the elastomer is provided, with a case where no elastomer is provided, in terms of a relationship between an amount of compression (stroke) and a linear pressure (a sealing pressure) at the time of fastening the fuel cell stack 10. The amount of compression corresponds to a deformation amount of the first separator plate 150. Until the amount of compression reaches h1 (the interval h1 of FIG. 4), even if the elastomer is provided, the root of the protruding portion 152 does not make contact with the elastomer 180, so that no reaction force is received from the elastomer 180. Accordingly, similarly to the case where no elastomer is provided, the first separator plate is deformed elastically like a spring. Due to a reaction force generated by the elastic deformation, a linear pressure (a sealing pressure) is given. This state is referred to as the non-elastomer-reaction-force state as described above. In the non-elastomer-reaction-force state, the linear pressure (sealing pressure) is low and does not reach a magnitude necessary for sealing. Further, manufacturing tolerances of the first separator plate 150, the second separator plate 160, and the frame 140 can be absorbed in a state with a low linear pressure (the non-elastomer-reaction-force state).

In a case where the elastomer 180 is provided, when the amount of compression is larger than h1, the root of the protruding portion 152 makes contact with the elastomer 180, so that the elastomer 180 is deformed. In this case, a reaction force generated by the deformation of the elastomer 180 is added to the reaction force generated by the elastic deformation of the first separator plate, so that the linear pressure (sealing pressure) as a whole increases steeply in comparison with the reaction force of the elastic deformation. In the meantime, in a case where no elastomer 180 is provided, even if the amount of compression increases more than h1, the linear pressure (the sealing pressure) increases at the same gradient as h1. Note that in either of the cases where the elastomer 180 is provided and where no elastomer 180 is provided, when the deformation amount of the first separator plate 150 exceeds a given magnitude, the first separator plate 150 deforms plastically beyond an elastic limit.

In a case where no elastomer 180 is provided, no reaction force due to the elastomer 180 is added. Accordingly, even if the deformation amount exceeds the elastic limit, a necessary sealing pressure cannot be secured in some cases. Particularly, in a case where the separator plate 150 is made of a material with a small Young's modulus (titanium, SUS, aluminum, or the like), the necessary sealing pressure cannot be secured in some cases. In a case where the elastomer 180 is provided, since the reaction force due to the elastomer 180 is added, the necessary sealing pressure can be secured before the deformation amount of the first separator plate 150 exceeds the elastic limit, that is, while the first separator plate 150 can be elastically deformed.

Thus, in the present embodiment, the fuel cell 100 includes the first separator plate 150 including the protruding portion 152 that is elastically deformable, the frame 140 including the recessed portion 141 (the cavity portion 142), and the elastomer 180 placed on the bottom 141a of the recessed portion 141. Accordingly, in the state (the non-elastomer-reaction-force state) where the linear pressure (the sealing pressure) is low, variations due to manufacturing tolerances are absorbed, and in the state (the elastomer-reaction-force generation state) where the linear pressure (the sealing pressure) is high, a necessary linear pressure (sealing pressure) can be secured.

Further, in the present embodiment, if the first separator plate 150 is deformed by h1 or more at the time of laminating the fuel cells 100, the reaction force due to the elastomer 180 is added. As a result, even at the same deformation amount, it is possible to increase the linear pressure (the sealing pressure) to be obtained by the elastic deformation of the first separator plate 150. Further, before the first separator plate 150 is deformed plastically, a necessary linear pressure (sealing pressure) can be secured.

Second Embodiment

Figure 8:
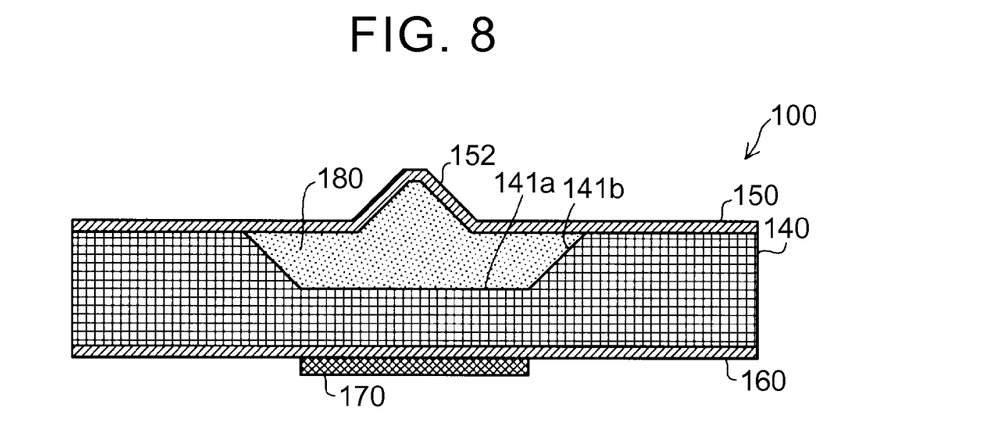
FIG. 8 is an explanatory view illustrating a section of a sealing line of a fuel cell of a second embodiment.

FIG. 8 is an explanatory view illustrating a section of a sealing line of a fuel cell 100 of the second embodiment. In the first embodiment, the elastomer 180 is placed on the bottom 141a of the recessed portion 141. However, in the second embodiment, a cavity portion 142 is entirely filled with an elastomer 180. In this embodiment, at the time of compression to form a fuel cell stack, it is possible to achieve a large linear pressure (sealing pressure) in an entire region of an amount of compression (stroke).

Figure 9:
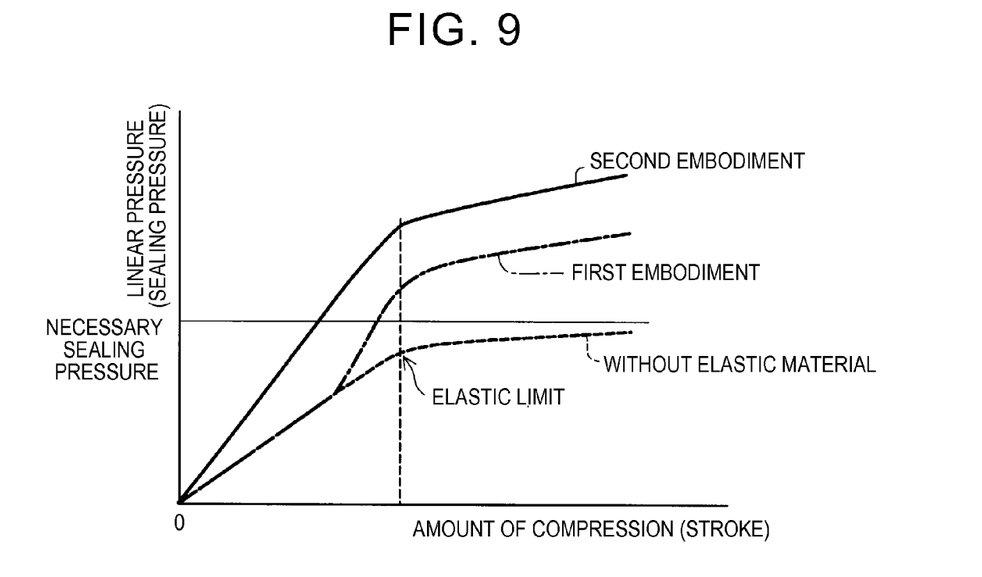
FIG. 9 is an explanatory view illustrating a relationship between an amount of compression (stroke) and a linear pressure (a sealing pressure) in the second embodiment.

FIG. 9 is an explanatory view illustrating a relationship between an amount of compression (stroke) and a linear pressure (a sealing pressure) in the second embodiment. As is apparent from FIG. 9, the linear pressure (sealing pressure) is increased in the entire region of the amount of compression (stroke).

Note that, in FIG. 8, the cavity portion 142 is entirely filled with the elastomer 180. However, the cavity portion 142 may not be entirely filled with the elastomer 180, provided that, in a state where no external force for fastening of the fuel cell stack 10 is applied, the elastomer 180 makes contact with both the first separator plate 150 and the frame 140. Even in this case, it is possible to achieve a large linear pressure (sealing pressure) in the entire region of the amount of compression (stroke).

Third Embodiment

Figure 10:
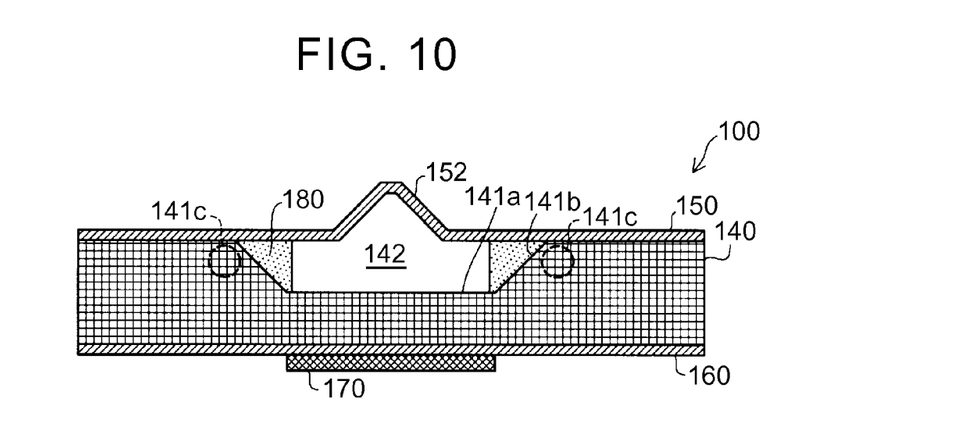
FIG. 10 is an explanatory view illustrating a section of a sealing line of a fuel cell of a third embodiment.

FIG. 10 is an explanatory view illustrating a section of a sealing line of a fuel cell 100 of the third embodiment. In the first embodiment, the elastomer 180 is placed on the bottom 141a of the recessed portion 141. However, in the third embodiment, an elastomer 180 is placed along a side surface 141b of a recessed portion 141. A stress is easy to be concentrated on a frame side 141c of the side surface 141b, due to deformation of a first separator plate 150. In the present embodiment, by placing the elastomer 180 along the side surface 141b of the recessed portion 141, the stress applied to that frame side face portion 141c of the side surface 141b which is on a frame side is relaxed. Further, in the third embodiment, a reaction force due to the elastomer 180 is added, which is not as large as in the second embodiment. Accordingly, at the time of compression to form a fuel cell stack 10, it is possible to achieve a large linear pressure (sealing pressure) in an entire region of an amount of compression (stroke).

Fourth Embodiment

Figure 11:
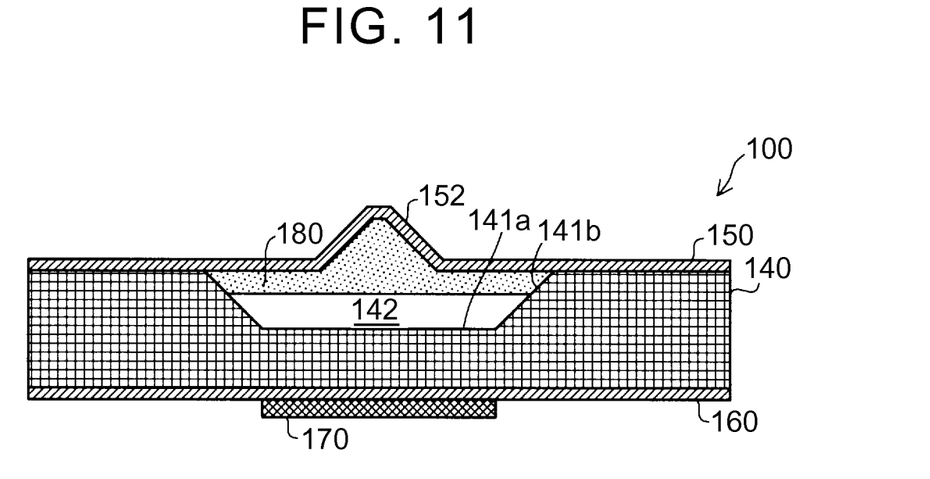
FIG. 11 is an explanatory view illustrating a section of a sealing line of a fuel cell of a fourth embodiment.

FIG. 11 is an explanatory view illustrating a section of a sealing line of a fuel cell 100 of the fourth embodiment. In the first embodiment, the elastomer 180 is placed on the bottom 141a of the recessed portion 141. However, in the fourth embodiment, an elastomer 180 is placed on a first separator plate side of a cavity portion 142. In the fourth embodiment, a stress to a protruding portion 152 can be relaxed by use of the elastomer 180. Further, in the fourth embodiment, a reaction force due to the elastomer 180 is added, which is not as large as in the second embodiment. Accordingly, it is possible to achieve a large linear pressure (sealing pressure) in an entire region of an amount of compression (stroke).

Thus, as described in the first to fourth embodiments, the elastomer 180 should be placed in at least part of the cavity portion 142. This makes it possible to increase the linear pressure (sealing pressure).

The embodiments of the present invention have been described above based on some examples, but the above embodiments of the present invention are intended to facilitate understanding of the present invention, and not to limit the present invention.

What is claimed is:

1. A fuel cell comprising:
a membrane electrode assembly;
a frame configured to support the membrane electrode assembly from its outer edge;
a first separator plate and a second separator plate configured to sandwich the membrane electrode assembly and the frame there between; and
an elastomer, wherein:
the first separator plate includes an elastically deformable protruding portion projecting away from a first separator side of the frame;
the frame has a recessed cavity portion facing a back of the protruding portion of the first separator plate; and
the elastomer is placed in at least part of the cavity portion.

2. The fuel cell according to claim 1, wherein:
the elastomer is a rubber material or a urethane material.

3. The fuel cell according to claim 1, wherein:
the cavity portion includes a bottom and a side face portion, and
the elastomer is provided on the bottom of the cavity portion.

4. The fuel cell according to claim 1, wherein:
in a state where the first separator plate is not deformed by an external force, the elastomer makes contact with both the first separator plate and the frame.

5. The fuel cell according to claim 1, wherein:
the cavity portion includes a bottom and a side face portion, and
the elastomer is provided on the side face portion of the cavity portion.

6. The fuel cell according to claim 1, wherein:
the elastomer is provided on a first-separator-plate side of the cavity portion.

* * * * *